J. H. LANDRY.
SPRING WHEEL.
APPLICATION FILED JAN. 3, 1919.

1,321,218.

Patented Nov. 11, 1919.

INVENTOR
J. H. Landry
BY
ATTORNEYS

UNITED STATES PATENT OFFICE.

JOSEPH HENRY LANDRY, OF APPLETON, WISCONSIN.

SPRING-WHEEL.

1,321,218.

Specification of Letters Patent.  Patented Nov. 11, 1919.

Application filed January 3, 1919.  Serial No. 269,499.

*To all whom it may concern:*

Be it known that I, JOSEPH HENRY LANDRY, a citizen of the United States, and a resident of Appleton, in the county of Outagamie and State of Wisconsin, have invented certain new and useful Improvements in Spring-Wheels, of which the following is a specification.

My invention is an improvement in spring wheels, and has for its object to provide a wheel of the character specified, having the resiliency of a pneumatic tire, without of danger of punctures or blow-outs.

In the drawings:—

Figure 1:
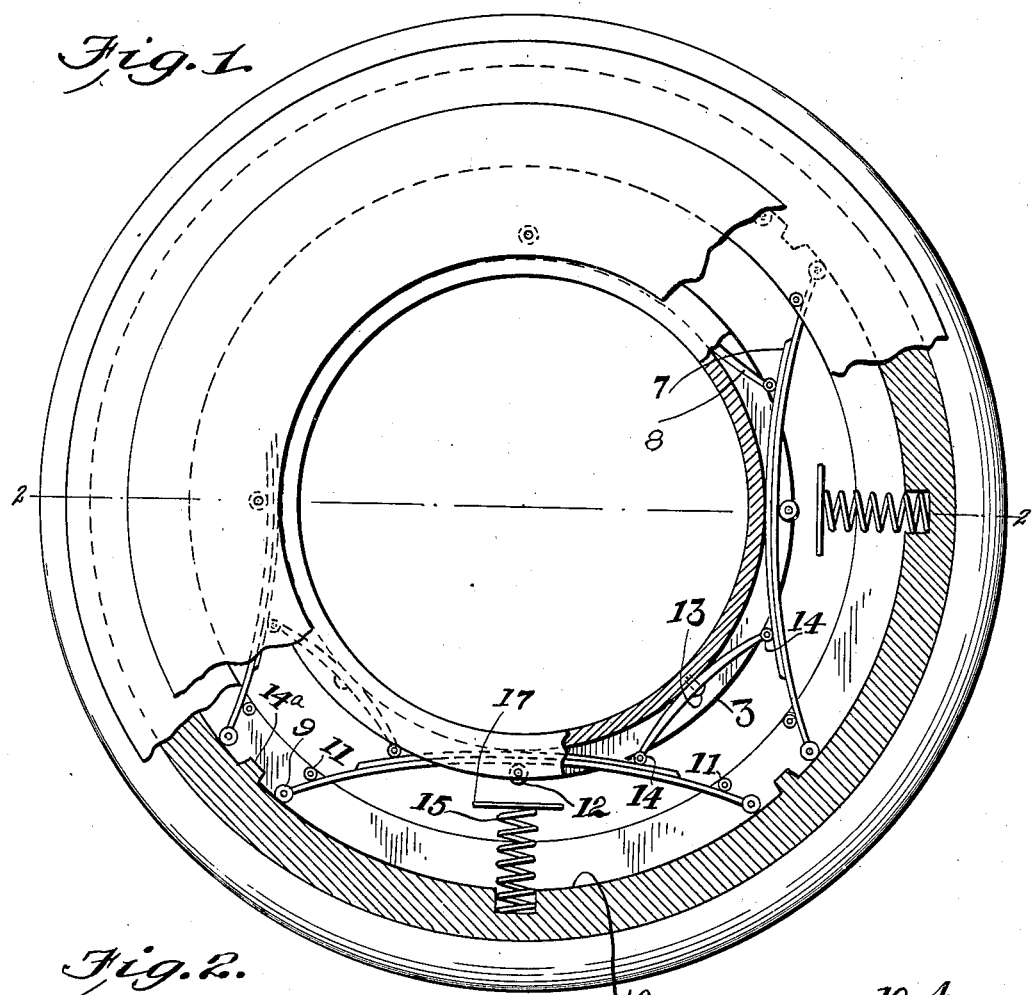
Figure 1 is a side view of the improved wheel with parts in section.
Figure 2:
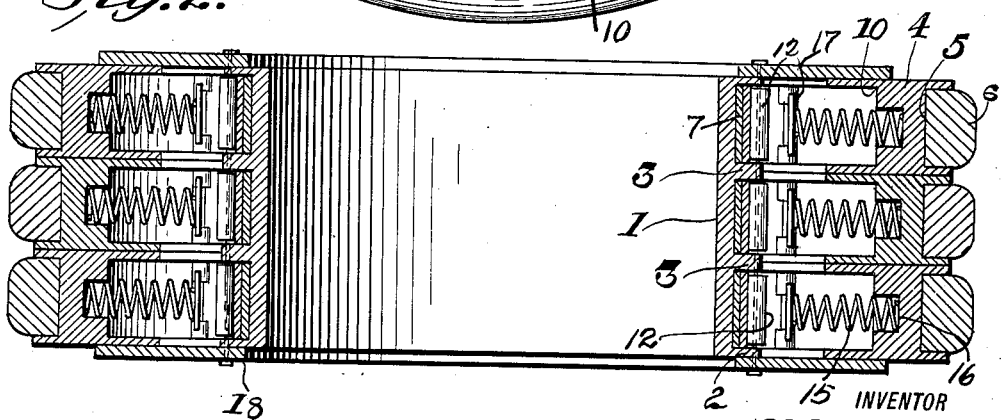
Fig. 2 is a section on the line 2—2 of Fig. 1.

In the present embodiment of the invention, the wheel comprises a rim 1, which has on its peripheral surface a series of circumferentially extending ribs 2 and 3, the ribs 2 being at the side edges of the rim while the ribs 3 are intermediate the side edges. A series of tread rings 4 is arranged co-axially with the rim 1, each tread ring having a peripheral annular groove 5, in which is arranged a continuous tread 6 of rubber or the like, the said treads extending beyond the outer faces of the rings to engage the ground.

Each tread ring is held in spaced co-axial relation with respect to the rim 1 under normal conditions, by a series of semi-elliptical springs 7 and 8, the springs 7 in the present instance being laminated. Each of the springs 7 rests at its center within the space between two ribs 2 or 3 as the case may be, and the ends of each spring 7 have rollers 9 which extend into annular grooves 10 in the inner faces of the tread rings, the said rollers rolling upon the bottoms of the grooves to permit free movement of the spring without friction.

Each spring 7 is held in the proper relative position with respect to the rim 1, and the adjacent tread ring by means of rollers 11 and 12, the rollers 12 being between the ribs 2—3, while the rollers 11 are within the grooves 10.

The springs 8 are secured at their centers to the rim between the ribs 2 and 3 as indicated at 13, and each end of each spring has rollers 14 which engage the convex surface of the springs 7. The springs 7 are free to move between the rollers 12 and the rim, but they are held from displacement by stops 14ª on the rim in the bottom of the grooves, the rollers 9 engaging the stops to limit the longitudinal movement of the spring.

In order to prevent shock or jar in case of overload, that is, in order to provide excess resiliency for overload, coil springs 15 are arranged at the centers of the springs 7, each spring 15 engaging at one end in a recess 16 in the tread ring, and having at the other end a plate 17 for engaging the ribs 2 and 3 of the rim.

Housing rings 18 are connected with the rim 1 for closing the space between the rim and the tread plates. It will be understood that instead of three tread rings, a single ring might be used, with single series of springs 7 and 8. The number of tread rings will depend upon the character of the wheel.

I claim:—

In a spring wheel, a rim, a tread ring arranged coaxially with the rim and annularly grooved on its inner face, the rim having a groove registering therewith, a series of semi-elliptical springs having the central portions thereof loosely held in the groove of the rim and engaging at their ends in the groove of the ring, a series of auxiliary springs secured at their centers to the rim and engaging at their ends the ends of the first named springs, the ends of each spring of each series having friction rollers, and the ring having stops for engagement by the rollers of the first named spring, and auxiliary springs for taking overload.

JOSEPH HENRY LANDRY.